(12) United States Patent
McKenzie

(10) Patent No.: US 6,793,808 B2
(45) Date of Patent: Sep. 21, 2004

(54) COMBINATION VALVE SUPPORT AND SEALING ELEMENT FOR FILTER CARTRIDGES

(75) Inventor: Darrell T. McKenzie, Gastonia, NC (US)

(73) Assignee: Dana Corporation, Toledo, OH (US)

( * ) Notice: Subject to any disclaimer, the term of this patent is extended or adjusted under 35 U.S.C. 154(b) by 2 days.

(21) Appl. No.: 09/901,632

(22) Filed: Jul. 11, 2001

(65) Prior Publication Data

US 2003/0164323 A1 Sep. 4, 2003

(51) Int. Cl.⁷ .............................................. B01D 27/10
(52) U.S. Cl. ...................... 210/130; 210/136; 210/443; 210/455; 137/512.4
(58) Field of Search ................................. 210/130, 136, 210/133, 440, 443, DIG. 17, 455; 137/512.4, 859

(56) References Cited

U.S. PATENT DOCUMENTS

| | | | |
|---|---|---|---|
| 3,567,023 A | | 3/1971 | Buckman et al. |
| 3,669,144 A | * | 6/1972 | Palmai ........................ 137/854 |
| 3,785,491 A | | 1/1974 | Dudinec et al. |
| 4,144,168 A | | 3/1979 | Thornton |
| 5,833,843 A | | 11/1998 | Covington |
| 6,027,640 A | | 2/2000 | Covington et al. |
| 6,096,199 A | | 8/2000 | Covington |
| 6,136,183 A | | 10/2000 | Suzuki et al. |

FOREIGN PATENT DOCUMENTS

| | | | | |
|---|---|---|---|---|
| GB | 1450395 | * | 9/1976 | |
| JP | 2000140525 A | * | 5/2000 | ........... B01D/35/02 |

* cited by examiner

Primary Examiner—Terry K. Cecil
(74) Attorney, Agent, or Firm—Millen, White, Zelano & Branigan, P.C.

(57) ABSTRACT

A valve support and sealing element 23 for use with a filter cartridge is in the form of a molded unitary body (FIG. 2). The body includes (i) a first annular section 30 projecting into the filter hollow core 13 and having a sealing ring 33 for sealing with the end cap 53;

(ii) a second annular section 34 sealing with the end plate 17 at interface 35; and (iii) a flange 38 radially projecting from the second section 34 to cover the inlet openings 19 to act as an anti-drainback valve. The flange 38 includes radial ribs 42 that also extend axially on the first section 30 but are spaced from the sealing ring 33. In operation, upon clogging of the media 14, oil flows between the ribs 42 and the sealing ring 33 is deflected radially inwardly to provide a bypass for the oil.

16 Claims, 1 Drawing Sheet

COMBINATION VALVE SUPPORT AND SEALING ELEMENT FOR FILTER CARTRIDGES

FIELD OF THE INVENTION

The present invention is directed to combination valve supports and sealing elements for filter cartridges. More particularly the present invention is directed to combination valve supports and sealing elements for use in filter cartridges, wherein the valve supports and sealing elements provide a bypass when filter elements within the filter cartridge are clogged and provide an anti-drainback capability when the filter cartridge is not actively filtering.

BACKGROUND OF THE INVENTION

It is necessary and desirable for filter cartridges to have a bypass in case filter media in the filter cartridge becomes clogged so that the machine utilizing the fluid being filtered is not starved for fluid. For example, it is necessary for filter cartridges which filter lubricating oil of internal combustion engines not to block the flow of oil to the engine if their filter media becomes clogged. It is also desirable to prevent oil fluid from draining out of a filter cartridge when the fluid is not under pressure. For example, with internal combustion engines if the engine is not running, it is preferable to maintain oil in the cartridge so that when the engine is restarted, oil is immediately available for circulation.

During manufacture, when dispirate parts are matched, the risk of failure is increased because one of the parts may be of inferior quality and adversely affect the reliability of the entire assembly. It is frequently time consuming and therefore costly to assemble a plurality of elements in order to configure an item reliably. Consequently, utilizing only a single element can be advantageous. This is especially the case with mass produced items such as filters for engine lubricating oil which are manufactured by the millions.

SUMMARY OF THE INVENTION

In view of the aforementioned considerations, the present invention is directed to a combination valve support and sealing element for use in a filter cartridge in which the filter cartridge includes an annular filter element in a housing closed by an end plate, the end plate having a central opening surrounded by an array of spaced radially positioned openings. The combination valve support and sealing element comprises the unitary body of resilient material, wherein the unitary body has a central opening of a constant diameter which is coaxial with the central opening of the end plate and has an outer diameter less than that defined by the spaced radially positioned openings. The unitary body has a first section which projects into the hollow core of the filter element, the first section having a sealing ring thereon for sealing with the filter element. The unitary body also includes a second section coextensive with the first section which seals with only the end plate around the central opening through the end plate. The unitary body further has a radially projecting flange which is axially spaced from the second section of the unitary body and extends radially beyond the spaced radial openings for sealing around the spaced radial openings to provide an anti-drainback valve. A plurality of radially extending ribs are disposed on the radially extending flange, the radially extending ribs having rib portions projecting axially on the first annular section of the unitary body and being axially spaced from the annular sealing ring on the first section of the unitary body, which annular sealing ring deflects inwardly when the filter element is clogged in order to provide a bypass for fluid, when the fluid is unable to flow through the filter element.

In a further aspect of the invention, the combination valve support and sealing arrangement the radially extending portions of the rib support the filter element thereon;

In still a further aspect of the invention, the axially extending rib portions engage an end cap on the filter element and provide axially extending gaps therebetween, wherein fluid in the gaps applies pressure to the sealing ring, which pressure causes the sealing ring to deflect inwardly when a preselected pressure indicative of a clogged filter element is reached.

In still further aspects of the invention, resilient material of the unitary body is a rubber such as nitrile rubber.

In another aspect of the invention, the filter cartridge includes a filter element for filtering lubricating oil.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
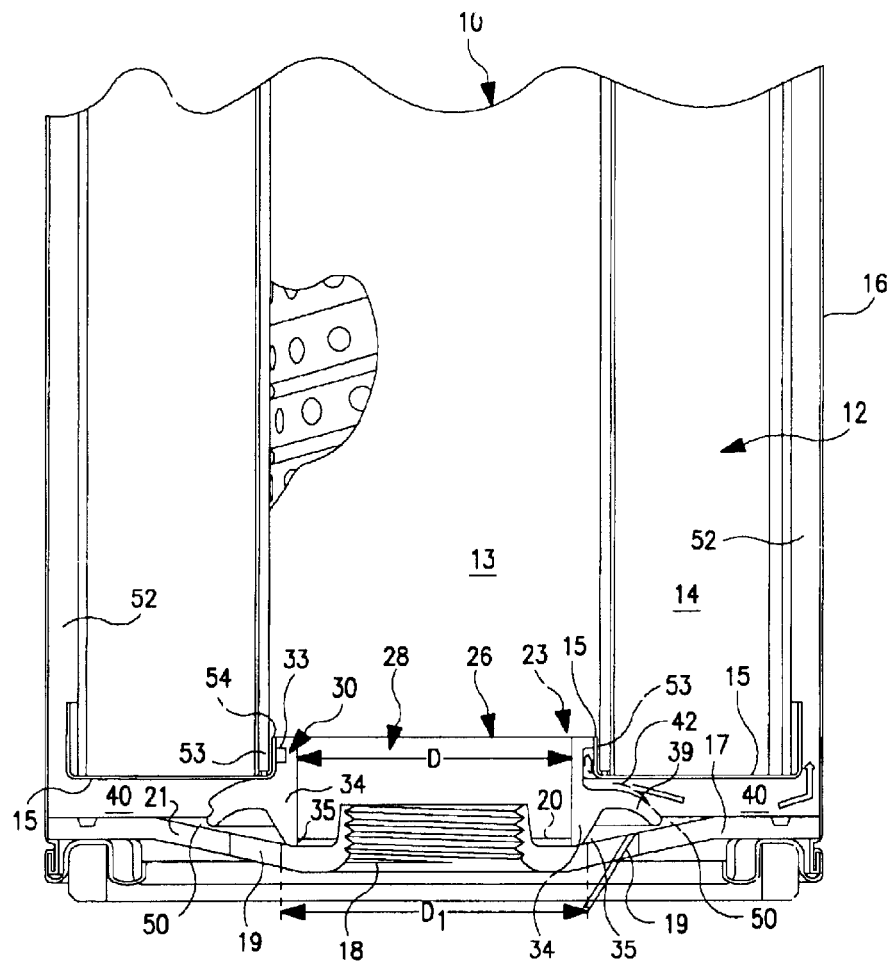
FIG. 1 is a side elevation showing combination valve support and sealing element in accordance with the present invention used in filter cartridge having a filter element therein.
Figure 2:
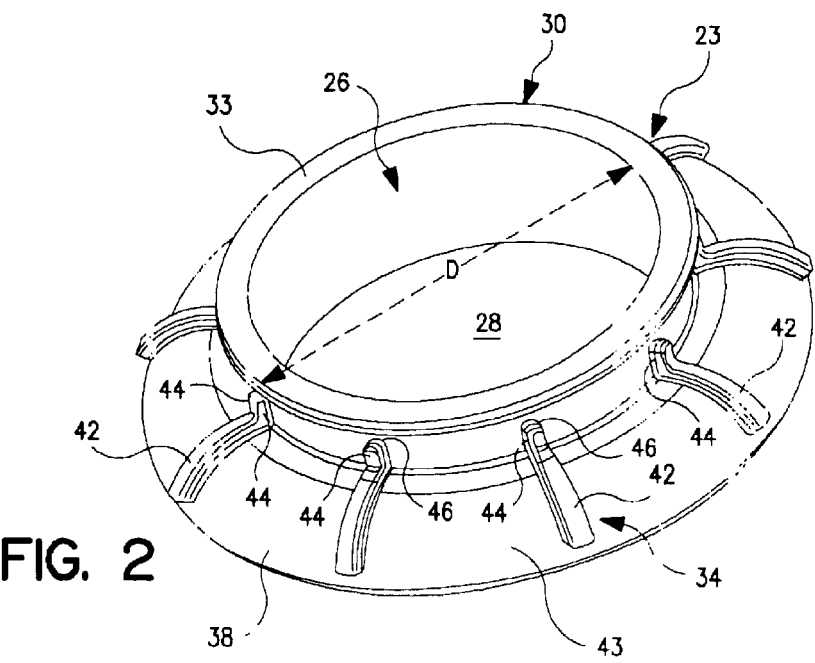
FIG. 2 is a perspective view of a combination valve support and sealing element in accordance with the present invention.

Referring now to FIGS. 1 and 2, there is shown a filter cartridge 10 which includes therein an annular filter element 12 having a hollow core 13. The annular filter element 12 includes a filter media 14 having an end closed by an end cap 15. A filter element 12 is disposed within a housing 16 closed by an end plate 17. The end plate 17 may be secured to the housing 16 in accordance with known practices.

The end plate 17 has a threaded central opening 18 so that the filter cartridge 10 can be mounted as a "spin-on" cartridge to a device such as, for example, an internal combustion engine. Disposed around the threaded central opening 18 are a plurality of openings 19 which are radially spaced from the threaded central opening 18 by an annular plate portion 20. Beyond the plurality of openings 19, there is a second plate portion 21 on the end plate 17.

The filter element 12 is supported on a valve support and sealing element 23 which is in the form of a unitary body 26 of resilient plastic material. Preferably, the unitary body 26 is molded of rubber, nitrile rubber, or another suitable flexible resilient material.

The unitary body 26 has a central opening 28 of a constant diameter D. The central opening 28 is coaxial with the threaded central opening 18 of the end plate 17 and has a diameter less than the radial distance $D_1$ between the radial openings 19.

Unitary body 26 has a first annular section 30 which projects into the hollow core 13 of the filter element 12. The first annular section 30 has a sealing ring 33 thereon which seals with the end cap 15 of the filter element 12. As will be further explained hereinafter, sealing ring 33 defines a bypass valve for allowing fluid which enters the radially positioned openings 19 to bypass the filter 12 if the filter 12 becomes clogged.

The unitary body 26 further includes a second section 34 which is coextensive with the first section 30 and seals with the end plate 17 by engaging the first end plate portion 20. Since the first section 30 and the second section 34 are unitary with a relatively large thickness, they provide a support for the filter element 12 which abuts and is urged against the unitary body 26 in a known way, such as for example, by a coil spring (not shown) at the upper end of the filter element 12. In the illustrated, and preferred embodiment the second section 34 has a frustoconical section which adds thickness and strength and directs the axial force exerted by the filter element 12 toward a sealing interface 35 with the first panel portion 20.

Unitary body 26 has a radially projecting flange 38 which is axially spaced from the sealing interface 35 and from the sealing ring 33 within the hollow core 13 of the filter element 12. The radially projecting flange 38 projects radially beyond the spaced radial openings 19 through the end plate 17 for sealing with the plate portion 21 outboard of the spaced radial openings 19. The radially projecting flange 38 thus provides an anti-drainback valve which closes off the openings 19 from radial space 40 between the end plate 17 on the housing 16 and the end cap 15 of the filter element 12.

A plurality of radially extending ribs 42 extend radially on the surface 43 of the radially extending flange 38. Radially extending ribs 42 have portions 44 which extend axially on the first annular section 30 of the unitary body 26. There are spaces 46 between the axially extending rib portions 44 and the ring 33 so that the ring 33 is not stiffened by the axially extending portions 44 of the ribs 42 and can flex under fluid pressure to deflect inwardly when the filter cartridge 10 is operating in a bypass mode due to clogging of the filter element 12.

Referring now mainly to FIG. 1, a fluid such as for example lubricating oil flows under pressure in through openings 19 which function as inlet openings and deflects the radially projecting flange 38 away from the outer plate portion 21. This deflection provides a gap 50 establishing communication between the radially spaced openings 19 and the annular space 40. The fluid then flows radially through the annular space 40 and up into an annular gap 52 between the housing 16 and filter media 14. Thereafter, the fluid then flows through the filter media 14 into the hollow core 13 of the filter element 12 and out through the threaded central opening 18. As long as the fluid is under pressure, the gap 50 remains open. However, once the fluid is depressurized, the radially projecting flange 38 recloses against the second plate portion 21. This prevents fluid in the filter media 14, the annular gap 52 and the radial space 40 from flowing back out of the inlet openings 19 to the device using the filter. If for example the device using the filter is an internal combustion engine and the fluid is lubricating oil, oil will remain within the housing 16 when the engine stops so that there is no momentary oil starvation of the engine when the engine restarts.

If the filter media 14 of the filter element 12 becomes clogged, then pressure builds up within the annular gap 52 and the radial space 40. This pressure is applied between the ribs 42 upon which the end cap 15 of the filter element 12 rests and thus radially against first section 30 of the unitary body 26 and directly against the annular sealing lip 33. This causes the sealing lip 33 to deflect inwardly away from the axially extending flange 53 of the end cap 15, allowing the oil to flow directly into the hollow core 13 without passing through the filter media 14. The annular flange 53 of the end cap 15 which seals the filter media 14 is a continuous cylindrical surface with no passages therethrough so that the fluid flows past the inner terminal edge 54 of the end cap, which edge lies in a single plane and is continuous without notches. The oil then flows from the central core 13 out of the threaded central opening 18 so that the engine is still supplied with oil even though the filter media 14 is clogged.

From the foregoing description, one skilled in the art can easily ascertain the essential characteristics of this invention, and without departing from the spirit and scope thereof, can make various changes and modifications of the invention to adapt it to various usages and conditions.

I claim:

1. A unitary valve within a filter cartridge disposed between a filter element and an end plate, comprising:
   a unitary valve body of resilient flexible material including
   a bypass valve portion unitary with the valve body, the bypass valve portion being configured as a collar having a sealing portion for sealing with the filter element and spaced projections upstream of the sealing portion, the spaced projections being disposed between and engaging both the bypass valve portion and the filter element for allowing direct fluid pressure application to the sealing portion, wherein when the filter element is clogged, increased fluid pressure separates the sealing portion from the filter element allowing the fluid to bypass the filter element.

2. The unitary valve according to claim 1 wherein an anti-drainback valve configured as a skirt extends radially from the collar.

3. The unitary valve according to claim 2 wherein ribs extend over the skirt to provide channels between the filter element and valve body for applying fluid pressure to the sealing portion.

4. The unitary valve of claim 3 wherein the resilient flexible material is rubber or nitrile rubber.

5. The unitary valve according to claim 1 wherein the projections are ribs on the collar.

6. The unitary valve according to claim 1 wherein the sealing portion is an annular lip.

7. The unitary valve according to claim 6 wherein ribs extend over the valve body to provide channels for applying fluid pressure to the annular lip.

8. The unitary valve according to claim 1 wherein the valve includes a portion abutted by the filter element for supporting the filter element thereon.

9. A unitary filter element support and valve within a filter cartridge for mounting and being disposed between a filter element and an end plate within a filter cartridge, comprising:

a unitary valve body of resilient flexible material;

a bypass valve portion unitary with the valve body, the bypass valve portion being configured as a collar and having a sealing portion for sealing with the filter element, spaced projections upstream of the sealing portion, the spaced projections being disposed between and engaging the bypass valve portion and the filter element for allowing direct fluid pressure application to the sealing portion, wherein when the filter element is clogged increased fluid pressure separates the sealing portion from the filter element allowing fluid to bypass the filter element, and an anti-drainback portion unitary with the body, the anti-drainback portion overlying inlet openings through the end plate.

10. The filter element support and valve according to claim 9 wherein the anti-drainback valve is a skirt extending radially from the collar portion.

11. The filter element support and valve according to claim 10 wherein the projections are ribs on the collar.

12. The filter element support and valve according to claim 11 wherein the ribs extend over the skirt to provide channels between the filter element and valve body for applying fluid pressure to the sealing portion.

13. The filter element support and valve of claim 12 wherein the resilient flexible material is rubber or nitrile rubber.

14. The unitary valve according to claim 10 wherein the sealing portion is an annular lip.

15. The filter element support and valve according to claim 14 wherein the ribs extend over the skirt to provide channels between the filter element and valve body for applying fluid pressure to the annular lip.

16. A unitary filter element support and valve for mounting a filter element on an end plate within a filter cartridge, comprising:

a molded unitary body of resilient flexible material formed as a single element and including a central axis;

a radially-extending anti-drainback portion unitary with the body, the anti-drainback portion overlying inlet structure into an inlet chamber through the end plate; and a bypass valve portion unitary with the body, the bypass valve portion being configured as a collar and having a sealing portion for sealing with the filter element, said collar including spaced projections thereon upstream of the sealing portion for engaging the filter element and forming axially-extending channels between respective ones of said projections to allow fluid pressure from the inlet chamber to be applied to the sealing portion causing unseating thereof and a flow bypassing the filter element.

* * * * *